United States Patent [19]

Terasawa

[11] 4,447,820

[45] May 8, 1984

[54] INK SUPPLYING MECHANISM

[75] Inventor: Koji Terasawa, Mitaka, Japan

[73] Assignee: Canon Kabushiki Kaisha, Tokyo, Japan

[21] Appl. No.: 383,101

[22] Filed: May 28, 1982

[30] Foreign Application Priority Data

Jun. 8, 1981 [JP] Japan .................................. 56-86873

[51] Int. Cl.³ ...................... G01D 15/18; B41F 31/00; B41J 27/18

[52] U.S. Cl. ................................ 346/140 R; 101/202; 400/126; 400/202.2; 400/208; 400/470

[58] Field of Search .................... 346/140 R, 140 PD; 101/202; 400/126, 202.2, 208, 470

[56] References Cited

U.S. PATENT DOCUMENTS

| | | | |
|---|---|---|---|
| 3,056,384 | 10/1962 | Beale et al. | 101/202 X |
| 3,121,138 | 2/1964 | Murphy | 346/140 R UX |
| 3,386,102 | 5/1968 | Scheuzger et al. | 346/140 R |
| 3,482,258 | 12/1969 | Steen | 346/140 R |
| 4,183,031 | 1/1980 | Kyser et al. | 346/140 PD |
| 4,291,317 | 9/1981 | Corwin et al. | 346/140 R |

*Primary Examiner*—George H. Miller, Jr.

*Attorney, Agent, or Firm*—Fitzpatrick, Cella, Harper & Scinto

[57] ABSTRACT

An ink supplying mechanism has a plurality of flat ink containers each having an ink outlet tube for supplying ink outward. The ink outlet tubes are sealed by a sealing elastic coupling member to form a multi-color ink container. The ink cassette is removably connected to connecting tubes which lead to ink supply passages.

7 Claims, 7 Drawing Figures

INK SUPPLYING MECHANISM

BACKGROUND OF THE INVENTION

1. Field of the Invention

The present invention relates to an ink supplying mechanism which uses an ink cassette and more particularly an ink cassette which accommodates a plurality of ink containers as a multi-color ink container.

2. Description of the Prior Art

In the prior art, when multi-color printing is effected by a multi-color ink container, an ink cassette having a set of color ink containers is used. In such an arrangement, however, loading and unloading of the ink containers are troublesome and coupling units for the ink containers and an ink supply passage are of large size and hence an ink cassette is of large size.

SUMMARY OF THE INVENTION

It is an object of the present invention to provide an ink supplying mechanism which is easy to exchange and fill with multi-color ink.

It is another object of the present invention to provide an ink supplying mechanism which is small in size and simple in construction.

It is another object of the present invention to provide an ink supplying mechanism which prevents misconnection of ink containers of different colors to connecting tubes.

It is another object of the present invention to provide an ink supplying mechanism which facilitates the manufacture of ink containers.

It is another object of the present invention to provide an ink supplying mechanism which effectively uses ink.

The above and other objects of the present invention will be apparent from the following description of the preferred embodiments of the present invention.

DETAILED DESCRIPTION OF THE PREFERRED EMBODIMENTS

Figure 1A:
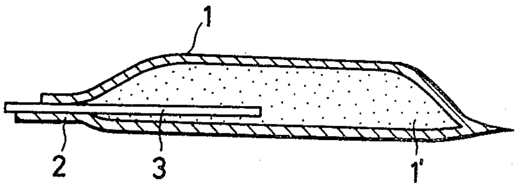
FIGS. 1A and 1B show a sectional view and a partial enlarged sectional view of an ink container structure.
Figure 1B:
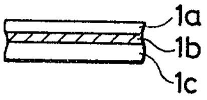

FIGS. 1A and 1B show a flexible ink container 1 of a flat bag structure for storing ink 1' therein. The container 1 is made of a three-ply laminated flexible film as shown in FIG. 1B, that is, it comprises an external protective plastic thin film 1*a* made of nylon having a thickness of 5–10 μm, an aluminum foil 1*b* having a thickness of approximately 10 μm for preventing evaporation of the ink and denaturation of the ink by ultraviolet rays and an internal main bag 1*c* made of a polyethylene thin film having a thickness of 50–70 μm. An ink outlet tube 3 for guiding the ink 1' outward is inserted in the ink container 1. The ink outlet tube 3 is made of polyethylene and it is thermally fused when a portion 2 is sealed by thermal fusing.

Figure 2A:
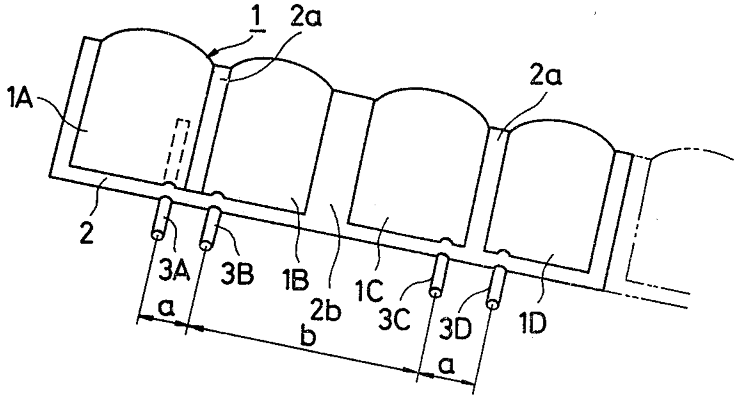
FIG. 2A shows a perspective view of a multi-color ink container having ink containers shown in FIG. 1 integrated in one unit.

Referring to FIG. 2A, a plurality of ink containers 1A, 1B, 1C and 1D constructed as described above are integrally formed with the thermal fused areas 2*a* and 2*b* connected together. The respective ink containers contain inks of different colors such as black, yellow, cyan and mazenta. The ink outlet tubes 3A, 3B, 3C and 3D inserted in the respective ink containers are arranged at off-centered positions of the respective ink containers. More specifically, they are arranged such that distances between adjacent ink outlet tubes alternately assume a, b, a. While only four ink containers are shown in FIG. 2A, there may be any number of ink containers such as 6 or 8 and the distances between adjacent ink outlet tubes alternately assume a, b, a, b, a . . . . Narrower fused areas 2*a* and wider fused areas 2*b* are alternately formed between adjacent ink containers.

Figure 2B:
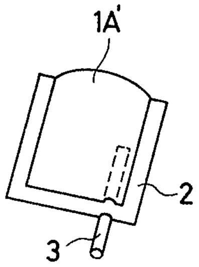
FIG. 2B shows a perspective view of an outer aspect of a separate color ink container.

As shown in FIG. 2B, the ink containers may not be formed as a unit but four separate ink containers 1A', 1B', 1C' and 1D' (not shown) for respective colors may be provided.

Figure 3:
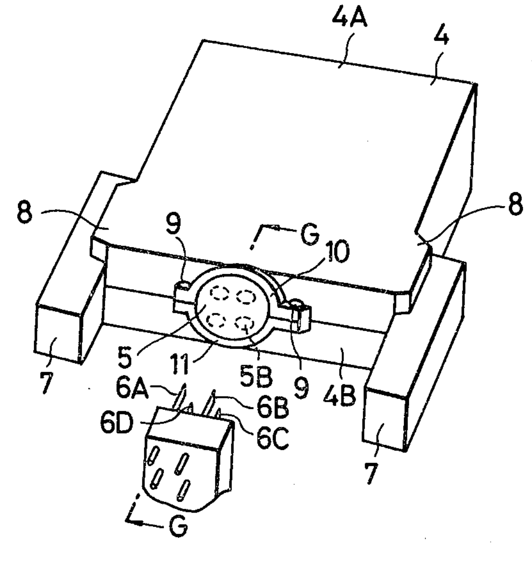
FIG. 3 shows a perspective view of an outer aspect of an ink cassette in accordance with the present invention.
Figure 4:
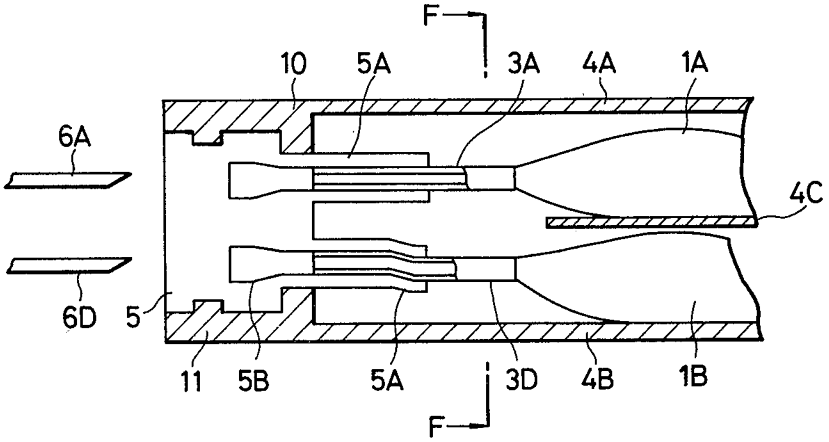
FIG. 4 shows a sectional view taken along a line G—G shown in FIG. 3.
Figure 5:
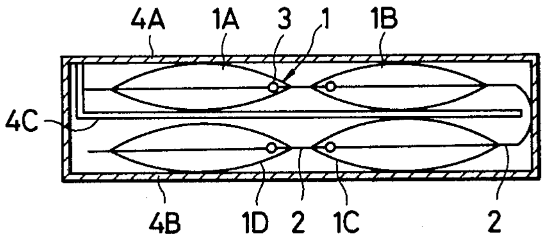
FIG. 5 shows a sectional view taken along a line F—F shown in FIG. 4.

The multi-color ink containers are accommodated in an ink cassette case 4 shown in FIGS. 3 to 5. The ink cassette case 4 comprises an upper case 4A and a lower case 4B, and it is sectioned into two chambers by a partition 4C fixed to one of the cases, as shown in FIGS. 4 and 5. The ink containers 1A and 1B are accommodated in a space defined by the upper case 4A and the partition 4C, and the ink containers 1C and 1D are accommodated in a space defined by the partition 4C and the lower case 4B. The upper case 4A has stoppers 8 for the insertion of the ink cassette case 4 into an ink supply passage (not shown). A base (not shown) of the ink cassette case 4 has guides 7 which guide the ink cassette case 4 to an ink supplying position and permit the loading of the ink cassette case 4 only when the ink cassette case 4 is inserted in a proper orientation. Connecting tubes (hollow pipes) 6A, 6B, 6C and 6D which are connected to the ink outlet tubes of the ink containers when the ink cassette case 4 is loaded in the loading position are fixed to the base of the ink supplying mechanism. A sealing elastic coupling member 5 is mounted on a surface opposing the connecting tubes 6A–6D of the ink cassette case 4. It functions to seal the outlet tubes 3A–3D of the ink containers as seen from FIG. 4. Also as seen from FIG. 4, the elastic coupling member 5 and the ink containers 1A–1D are connected at four thin tube connecting areas 5A at a rear end of the elastic coupling member 5. Gaps 5B of the elastic coupling member 5 are located at abutting positions to the connecting tubes 6A–6D so that the connecting tubes 6A–6D are connected to the outlet tubes 3A–3B through the elastic connecting member 5 as the ink cassette case 4 is moved. Since the tube connecting areas 5A are thin, they are readily deformed. In order to prevent the leakage of the ink when the tubes 6A–6D are removed, a compression force is applied to the elastic coupling member 5 by clamping frames 10 and 11 integrally formed in the upper case 4A and the lower case 4B, respectively, through bolts 9. When the ink cassette case 4 is moved along the guides 7 toward the connecting tubes 6A–6D, the connecting tubes 6A–6D pass through the sealing elastic coupling member 5 and thrust into the outlet tubes 3A–3D so that the inks of different colors contained in the ink containers 1A–1D are supplied to the ink supply passage. While the ink containers are stacked in two stages as shown in FIG. 5, the height is approximately 20 mm and a difference of levels of inks in the upper and lower ink containers is approximately 10 mm. Accordingly, it does not affect the supply of the inks. Since the ink cassette case 4 is directed to the connecting tubes 6A–6D by the stoppers 8, there is no risk of supplying wrong color inks.

Thus, the multi-color inks can be readily supplied from the ink cassette case to an ink jet printer. By connecting the rear ends of the connecting tubes 6A–6D to a vacuum pump and coupling the ink containers by a three-way cock at the positions shown in FIG. 3 when the inks are filled, the inks of different colors can be readily filled. When the inks of the four colors are not evenly used in color printing, the quantities of the respective inks may be adjusted so that the quantities of disposed inks when the ink cassette is exchanged can be minimized. While the respective ink containers contains inks of different colors in the illustrated embodiment, the ink of a particular color (e.g. black) which is frequently used may be contained in two or more ink containers. In this case, the waste of the unused inks is minimized and the inks can be efficiently used.

In the present invention, since the flat ink containers are sealed by the elastic coupling member to form the multi-color ink container, the levels of the inks in the ink containers which are arranged parallel to the bottom plane of the ink jet printer are substantially same. Accordingly, even when the quantities of the inks are small, the change of the ink levels is as small as 10 mm Aq. Thus, static pressures to the ends of the nozzles are equal and the inks are stably injected.

Since the ink cassette can be loaded and unloaded by a coupling member of a simple construction and the connecting tubes leading to the supply passages, the loading and unloading of the ink cassette are easy and the structure therefor is very compact.

Since the cassette case is sealed by the coupling member when the inks are filled, the inks of different colors can be readily filled.

What I claim is:

1. An ink supplying mechanism, comprising:

a plurality of ink containers each having an ink outlet tube for supplying ink out and having a bag structure made of a flexible film, said plurality of ink containers containing an ink of a different color;

a cassette case for accommodating said plurality of ink containers;

a guide member for guiding said cassette case to a loading position and for permitting the loading of said cassette case only when said cassette case is in a proper orientation; and a plurality of connecting tubes each connected to a corresponding one of said ink outlet tubes of said plurality of ink containers when said cassette case is at said loading position.

2. An ink supplying mechanism according to claim 1, wherein said cassette case includes on a side thereof an elastic coupling member for sealing said ink outlet tubes of said plurality of ink containers.

3. An ink supplying mechanism according to claim 1 or 2, wherein said plurality of ink containers are made of a laminated film including synthetic resin and are connected together at fusing areas by thermal fusing to form an integral unit.

4. An ink supplying mechanism according to claim 3, wherein said ink outlet tubes of said plurality of ink containers are arranged such that distances between adjacent ink outlet tubes alternately assume one distance and another distance.

5. An ink supplying mechanism according to claim 1 or 2, wherein said plurality of ink containers are separate from each other and said ink outlet tubes are located at off-centered positions of the respective ink containers.

6. An ink supplying mechanism according to claim 1, wherein at least two of said plurality of ink containers contain inks of the same color.

7. An ink cassette comprising:

a plurality of ink containers each having an ink outlet tube for supplying ink out, said plurality of ink containers containing an ink of a different color;

an elastic sealing member for sealing said ink outlet tubes of said plurality of ink containers; and a cassette case for accommodating said plurality of ink containers and for holding said elastic sealing member.

* * * * *

UNITED STATES PATENT AND TRADEMARK OFFICE

CERTIFICATE OF CORRECTION

PATENT NO. : 4,447,820

DATED : May 8, 1984

INVENTOR(S) : KOJI TERASAWA

It is certified that error appears in the above-identified patent and that said Letters Patent is hereby corrected as shown below:

Column 3, line 7, change "directed" to --directly inserted--.

Signed and Sealed this

*Sixth* Day of *November 1984*

[SEAL]

*Attest:*

GERALD J. MOSSINGHOFF

*Attesting Officer* *Commissioner of Patents and Trademarks*